: 3,793,268
PROCESS FOR THE PRODUCTION OF
POLYURETHANE FOAM RESINS
Werner Dietrich, Cologne-Stammheim, Konrad Uhlig and
Kuno Wagner, Leverkusen, Dieter Maaßen and Horst
Conrad, Dormagen, and Heinrich Bormann and Helmut
Piechota, Leverkusen, Germany, assignors to Bayer
Aktiengesellschaft, Leverkusen, Germany
No Drawing. Filed Mar. 19, 1971, Ser. No. 126,266
Claims priority, application Germany, Mar. 23, 1970,
P 20 13 787.5
Int. Cl. C08g 22/18, 22/46
U.S. Cl. 260—2.5 AT                         7 Claims

ABSTRACT OF THE DISCLOSURE

A process for the production of polyurethane foam resins from polyisocyanates, polyethers which contain hydroxyl groups, water and optionally other blowing agents and optionally flame retarding agents, emulsifiers, activators and other additives is provided which is characterized in that the polyisocyanates used are 20% to 85% solutions in liquid monomeric polyisocyanates (which are free from urethane groups or biuret groups) of urethane-containing polyisocyanates having molecular weights of about 410 to 3000 or of biuret-containing polyisocyanates of the general formula:

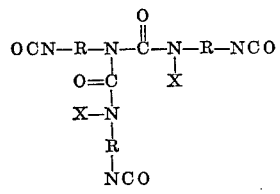

in which R represents a divalent aliphatic, araliphatic, cycloaliphatic or aromatic radical and X represents hydrogen or the group:

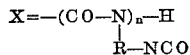

($n$ represents an integer of from 0 to 5), and the polyethers used are mixtures of polyethers having an alkylene oxide content of from about 65% to about 100% by weight and preferably 100% by weight of ethylene oxide, the polyether mixtures containing from about 25% to about 75% by weight, and preferably 40% to 60% by weight of difunctional and/or trifunctional polyethers and from about 75% to about 25% by weight, preferably 60% to 40% by weight, of polyethers having a functionality of 4 to 8. This invention also contemplates the use of an additional polyisocyanate which contains urethane groups and has an average molecular weight of from about 410 to 3000 in liquid monomeric polyisocyanates which are free from biuret groups.

---

Urethane foam resins having a variety of physical properties can be produced from compounds which contain several active hydrogen atoms, polyisocyanates, activators, stabilizers, water and/or other blowing agents and other additives by the isocyanate polyaddition process. With a suitable choice of the components, both elastic and rigid foams and foams of an intermediate nature within this range can be produced by such a process.

The production of foam resins which contain biuret as well as urethane groups is also known. Thus, for example, according to U.S. Pats. 3,124,605; 3,392,183; 3,441,588; 3,232,973; 3,284,479; 3,367,956; 3,517,039 and 3,647,848 a wide variety of low molecular weight polyisocyanates which contain biuret groups and crude solutions of such polyisocyanates in monomeric polyisocyanates can be used for producing polyurethane resins and foam resins by processes known per se. All of the biuret-containing foam resins produced by these known processes which are obtained from polyols that are free from ester groups are obtained from polyether polyols which contain high proportions of propylene oxide added to suitable initiators.

The hydroxy-containing polyethers used to produce hard polyurethane foams have a substantially higher OH number than the polyethers used for the production of soft polyurethane foams and are generally addition products of alkylene oxides, predominantly propylene oxide, with low molecular weight starting molecules or initiators such as water or polyols. However, such polyethers are generally only slightly miscible with polymeric isocyanates, which incompatibility increases greatly when polyether polyols containing large quantities of ethylene oxide residue are used. Due to the very high reactivity of ethylene oxide-polyether isocyanate systems, a practical foaming process is extremely difficult, if not impossible in some cases.

In addition, higher functional ethylene oxide polyethers are not miscible with the usual blowing agents such as monofluorotrichloromethane so that the viscosity cannot be reduced to the level required for high pressure foaming. On the other hand, ethylene oxide polyethers have a great practical advantage since the viscosity of such compounds is only about one tenth that of propylene oxide polyols of comparable OH number and functionality. In addition, ethylene oxide polyols differ from propylene oxide polyols in that they contain exclusively primary hydroxyl groups which are more highly reactive with isocyanates, thus resulting in a considerable saving with respect to the expensive catalysts used in the production of the foams. Because ethylene oxide polyols possess these significant advantages, the use of such materials in the production of polyurethane foam resins is desirable and the solution of problems inherent in their use would be a considerable technical advance.

Although it has already been disclosed in German Pat. 974,371 that polyurethane resins, including foam resins, may be produced from polyglycol ethers of ethylene oxide, the polyglycol ethers used in this process have a molecular weight of over 3000 to 5000 and a very low hydroxyl group content; polyglycol ethers of this type can easily be reacted with any polyisocyanates to yield soft elastic polyurethane foam resins.

It is therefore an object of this invention to provide a method for the production of polyurethane foam resins which is devoid of the foregoing disadvantages.

Another object of this invention is to provide a method for preparing hard polyurethane foam resins from polyols having a high proportion of ethylene oxide radicals.

A further object of this invention is to provide hard foam resins having exceptionally high compression strengths and heat distortion temperatures.

Still another object of this invention is to provide a process for the production of polyurethane foam resins in which the reactants are easily mixed to a homogeneous distribution, thus precluding premature and unwanted reactions that adversely affect the end product.

Yet another object of this invention is to provide a process for preparing foam resins that are suitable for use in the building industry, as thermal insulation, as filters, as packaging materials and so on.

The foregoing objects and others that will become apparent from the following description are accomplished in accordance with this invention, generally speaking, by providing a process for the production of polyurethane foam resins in which an hydroxyl polyether is reacted with an organic polyisocyanate in the presence of a blowing agent in which the hydroxyl polyether is a mixture of polyethers having an alkylene oxide constituency of from about 65% to about 100%, preferably 100%, by weight based on the total weight of the alkylene oxide component in the polyether is derived from ethylene oxide and from about 25% to about 75% by weight, preferably 60% to 40% by weight of the polyethers in the admixture, based on the weight of the mixture, have a functionality of two or three and from about 75% to about 25% by weight and preferably 40% to 60% by weight of the polyethers in the admixture have a functionality of four to eight, and the organic polyisocyanate is a solution in a liquid monomeric polyisocyanate free of biuret groups of from about 20% to about 80% by weight of a biuret polyisocyanate or a urethane containing polyisocyanate having a molecular weight of from 410 to 3000.

The biuret polyisocyanates of this invention have the formula:

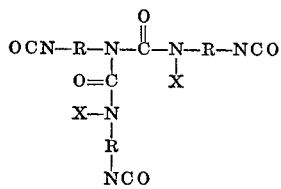

in which R is a divalent $C_2$–$C_{12}$-aliphatic, $C_7$–$C_{10}$-araliphatic, $C_5$–$C_{12}$ - cycloaliphatic or $C_6$–$C_{20}$ - aromatic radical and X is a hydrogen atom or the group:

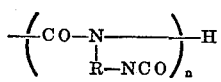

($n$ being an integer of from 0 to 5). This invention also contemplates the use of an additional polyisocyanate which contains urethane groups and has an average molecular weight of from about 410 to 3000 in liquid monomeric polyisocyanates which are free from biuret groups.

The biuret polyisocyanates to be used in the practice of this invention may be prepared by known methods, e.g. by the processes described in U.S. Pats. 3,124,605; 3,232,-973; 3,441,588; 3,517,039; 3,383,400; 3,284,479; 3,367,-956; 3,392,183; 3,350,438; 3,201,372 and 3,647,848.

Suitable starting materials from which the biuret polyisocyanates of this invention are prepared include aromatic, araliphatic, cycloaliphatic and aliphatic polyisocyanates such as 1-methyl-benzene-2,4-diisocyanate, 1-methyl-benzene-2,6-diisocyanate and commercial mixtures thereof, arylene diisocyanates and their alkylation products, m- and p-phenylene diisocyanates, naphthylene diisocyanates, diphenyl methane diisocyanates, di- and tri-isopropyl benzene diisocyanates, triphenyl methane triisocyanates, thiophosphoric acid tri-(p-isocyanatophenyl)-esters, aralkyl diisocyanates such as 1-(isocyanatophenyl)-ethyl isocyanate, m- and p-xylylene diisocyanate, alkylene diisocyanates such as tetra- and hexamethylene diisocyanate, trimethylhexamethylene diisocyanate, isophorone diisocyanate, 1-methylcyclohexyl-1,4-diisocyanate and its isomers, α, ω-diisocyanato carboxylic acid esters, polyisocyanates which may be substituted by various substituents such as alkoxy groups, nitro groups or chlorine or bromine atoms, any of the isocyanates listed in U.S. Pat. 3,350,362 and the like and mixtures thereof. Modified biuret types may also be prepared from suitable addition products of polyisocyanates in excess with polyhydroxyl compounds such as trimethylol propane, hexanetriol, glycerol or butane diol, and from polymerization products of the above mentioned polyisocyanates, optionally containing several isocyanurate rings per molecule, addition products of 2 to 8 mols of any polyisocyanates with one mol of aldimine or ketimine, or from polyisocyanates obtained by aniline formaldehyde condensation followed by phosgenation.

Higher molecular weight polyisocyanates which may be prepared by reacting monomeric polyisocyanates of the type mentioned above with higher molecular weight compounds which contain reactive hydrogen atoms, preferably higher molecular weight polyhydroxyl compounds, polycarboxyl compounds and polyamino compounds, may also be used. Mixtures of various polyisocyanates may also be used for the biuret-formation. Diphenylmethane diisocyanates which contain carbodiimide groups or uretonimine groups as described in German Pat. 1,092,007 or 4,4'-diphenylmethane diisocyanate which has been modified with subequivalent quantities of di- and tri-propylene glycol and thus liquified, and commercial isomeric mixtures of this modified 4,4'-diphenylmethane diisocyanate are also eminently suitable for the production of biuret polyisocyanates, as are polyisocyanates which contain semicarbazide and biuret groups, which polyisocyanates can be prepared as described in Belgian Pat. 721,031, e.g. from asymmetrically disubstituted hydrazines. The latter compounds are valuable antioxidants, stabilizers against discoloration at elevated temperature and age resistors for polyurethane foams and synthetic resins. Modified polyisocyanates which can be obtained by the telomerization of ethylenically unsaturated compounds with polyisocyanates are also suitable for the production of the biuret polyisocyanates which are to be used in the practice of this invention. Biuret polyisocyanate mixtures obtained by hydrogenating polyaddition reactions, for example, by the hydrogenation of polynitrile compounds and polynitriles in the presence of subequivalent quantities of monomeric polyisocyanates, are also suitable.

The type of biuret-containing polyisocyanates preferably used in the practice of this invention are such that the proportion of biuret polyisocyanates which contain more than three isocyanate groups, based on the total quantity of polyisocyanates which are free from biuret groups, is at least 40% by weight and the solution of these biuret polyisocyanates in monomeric liquid polyisocyanates which are free from biuret groups preferably contain 0.1 to 2% by weight of chemically bound emulsifiers.

These biuret polyisocyanates having high NCO functionality which are preferably used are advantageously prepared in such a manner that the reactants such as water or compounds which split off water react with the polyisocyanates in the presence of from about 0.03 to about 5% by weight and preferably 0.1 to 2% by weight of emulsifiers. These emulsifiers should contain OH, amino, amido, COOH, SH or urethane groups so that they are converted into emulsifiers which contain isocyanate groups as soon as they are added, since only a low concentration of them reacts with a large excess of monomeric polyisocyanates. It is immaterial whether the emulsifiers are introduced e.g. with water or added before the beginning of biuret formation e.g. to about 2% of the monomeric polyisocyanate present in the reaction vessel. By a suitable choice of the concentration ratios between the above mentioned reactants and the monomeric isocyanates and suitable temperature control it is possible to obtain transparent mixtures having elevated NCO functionality which are stable in storage.

Although any such suitable emulsifier may be used, the emulsifiers that are preferred are castor oil polyglycol ethers,

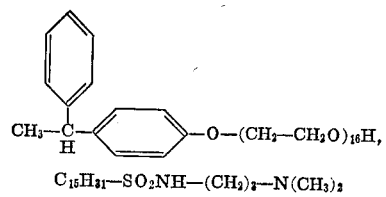

and the like. These emulsifiers are described in and may be prepared according to U.S. Pat. Nos. 2,674,619; 2,425,-845; 2,174,761 and 2,948,757.

The proportion of higher molecular weight biuret polyisocyanates can easily be increased by heating to temperatures of 160° C. to 180° C. Their proportion by weight can be determined by fractional precipitation and chromatographic analysis.

If desired, polybiuret polyisocyanates which have a high functionality may also be prepared by heating α,ω-diisocyanates which contain one or more urea groups with excess monomeric polyisocyanates or polyisocyanate mixtures to temperatures of about 180° C. in a first phase, the reactants dissolving and reacting to yield higher molecular weight polybiuret polyisocyanates. The polybiuret polyisocyanates may then be used with urethane-containing polyisocyanates which can be obtained e.g. by reacting an excess of polyisocyanates with low molecular weight or higher molecular weight polyols such as triols or diols, or they may be used with polyisocyanates which contain isocyanurate groups. Mixtures of such polybiuret polyisocyanates with polyisocyanates which have been modified and partly oxidized at elevated temperatures by the action of oxygen via hydroperoxy groups may also be used; these polyisocyanates are optionally of the type which can be obtained from stearylamine and salicylic aldehyde by gasification of polyisocyanates with air or oxygen in the presence of tin tetrachloride, iron chloride and copper and zinc complexes of Schiff's bases.

Biuret polyisocyanates obtained by reacting primary and secondary mono-, di- and polyamines with di- and polyisocyanates may also be used. A suitable method for preparing biuret polyisocyanates is set out in U.S. Pat. 3,201,372.

Th biuret-containing polyisocyanates and the urethane containing polyisocyanates of this invention may, if desired, also be used in admixture in liquid monomeric polyisocyanates which are free from biuret and urethane groups.

Reaction product of di- and polyisocyanates such as commercial tolylene diisocyanates and 4,4'-diisocyanato-diphenylmethane and isomers thereof with less than equivalent quantities of polyols are especially suitable for this purpose. The polyols used for the preparation of the di- or polyisocyanates which are modified with urethane groups are preferably the ethylene oxide-containing polyols which are subsequently used for the foaming process. The polyisocyanato-urethanes used have average molecular weights of 400 to 3000.

The polyisocyanoto-urethanes preferably used are addition products which contain at least two free NCO groups and which have been obtained by an addition reaction with low molecular weight polyols such as ethylene glycol, propylene-1,3-glycol, butylene-1,4-glycol and -2,3-glycol, glycerol, trimethylol propane, hexane-1,2,6-triol, butane-1,2,4-triol, trimethylol ethane, hydroxyethylated pentaerythritol, mannitol and sorbitol, methylglycoside, polyethylene glycols, polypropylene glycols, polybutylene glycols and their hydroxyethylated derivatives, various saccharic polyols and the like. These can be prepared in a known manner from excess polyisocyanates and the above mentioned polyols by reacting the polyisocyanates and polyols, e.g. in the preferred NCO/OH ratio 4:1 to 6:1 most preferably of 4.5:1. Very advantageous polyisocyanato-urethanes which have a high compatibility with polyethers are also the addition products of monomeric polyisocyanates such as commercial tolylene diisocyanates with low molecular weight acetals of formaldehyde which are prepared from one mol formaldehyde and two mols of ethylene glycol, diethylene glycol, triethylene glycol, glycerol or hydroxyethylated trimethylolpropane. However, the polyisocyanato-urethanes can be prepared from any suitable isocyanate such as those listed in U.S. Pat. 3,350,362 and any polyol such as those listed in U.S. Pat. 3,201,372.

The higher molecular weight biuret polyisocyanates used in the form of solutions in the practice of this invention are generally solid or resinous products or fairly viscous oils at room temperature. They have a surprisingly high solubility in monomeric liquid di- and polyisocyanates which are free from biuret groups. Any suitable liquid monomeric polyisocyanates which are free from biuret groups may be used including those of the type already mentioned above or exemplified in the patents cited, especially tolylene diisocyanates or multi-nuclear liquid polyisocyanates of the diphenylmethane series, as well as dicyclohexylmethane-4,4-diisocyanate, diphenyldimethylmethane-4,4'-diisocyanate, 4,6-dimethyl-1,3-xylylene diisocyanate, 2,6-diethyl-benzene-1,4-diisocyanate, m- and p-xylylene diisocyanate, isophorone diisocyanate, hexamethylene diisocyanate, tetramethylene diisocyanate and the like.

In accordance with this invention, polyether mixtures are used in which 65% to 100% by weight and preferably 100% by weight of the alkylene oxide content consists of ethylene oxide radicals. The polyether mixtures contain 25% to 75% by weight and preferably 40% to 60% by weight based on the weight of the mixture of difunctional and/or trifunctional polyethers and 75% to 25% by weight, preferably 60% to 40% by weight based on the weight of the mixture of polyethers which have a functionality of 4 to 8. These polyethers are prepared by the addition of ethylene oxide and optionally other alkylene oxides such as propylene oxide, butylene oxide, styrene oxide and the like to low molecular weight starting molecules such as water, low molecular weight alcohols, e.g. ethylene glycol, propylene glycol, dipropylene glycol, glycerol, hexane triol, trimethylol propane, sorbitol, mannitol or sucrose, amines such as ammonia, ethylene diamine, diethylene triamine or hexamethylene diamine, or higher molecular weight starting molecules such as styrenes or polyhydroxyl compounds such as hydroxyl polyesters or any of the polyethers disclosed in U.S. Pats. 2,948,691; 2,929,800 and 3,201,372 may also be used. The polyethers which according to the invention are used as mixtures have a molecular weight of 100 to 5000, preferably between 100 and 3500. In the process of the invention, low molecular weight compounds which contain reactive hydrogen atoms and have molecular weights of up to about 5000, e.g. butane-2,4- and 2,6-diol, tolylene diamine, 4,4'-diamino-diphenylmethane, hexane triol and any such compounds in U.S. Pat 3,201,372 may be included.

According to the invention, the polyethers used are preferably prepared from trimethylol propane, pentaerythritol, sorbitol or sucrose.

The biuret polyisocyanates and/or polyisocyanator urethanes are dissolved in the liquid monomeric polyisocyanates, but it is preferable to use the crude solution of biuret polyisocyanates or polyisocyanato urethanes in monomeric polyisocyanates, after which the concentration of the polyisocyanate mixture is adjusted as desired during the preparation of the addition products, for example, by preparing highly concentrated solutions which may then be adjusted to the required biuret polyisocyanate content or polyisocyanato urethane content by further dilution with various monomeric polyisolyanates.

When biuret polyisocyanates are used, the process of this invention yield products which have a much higher compression strength and heat distortion temperature than products prepared when monomeric polyisocyanates alone are used.

Numerous advantages also arise in the process of foam production itself. Mixing of the foam forming components is often difficult when only monomeric liquid polyisocyanates are used with the active hydrogen containing compound which is invariably highly viscous, thus requiring considerable time before a homogeneous distribution of the reactants can be achieved. As a result, premature and unwanted reactions can occur which adversely affect the end product. Advantageously, the biuret polyisocyanate systems of this invention, which preferably contain chemically bound emulsifiers or the urethane polyisocyanates of this invention are surprisingly effective solubilizing agents and can be mixed readily within a very short time with low molecular weight polyol compounds of various constitution and the other components of the reaction mixture so that the occurrence of unwanted premature reactions before the mixture has been homogenized are completely prevented.

Furthermore, any water used as a blowing agent can be much more uniformly distributed in the course of the foaming process and a uniform expansion is achieved thus yielding foams with a finer, more regular pore structure. Alkanes, haloalkanes or low boiling solvents in general such as methylene chloride, monofluorotrichloromethane, difluorodichloromethane, acetone, methyl formate and the like may also be used as blowing agents. Compounds which split off gases at elevated temperatures, e.g. azo compounds or diurethanes of bis-semiacetals from two mols of formaldehyde and one mol of ethylene glycol are also suitable blowing agents. Any of the blowing agents suggested in U.S. Pat. 3,201,372 may also be employed.

The production of the foam itself is carried out by known methods at room temperature or at elevated temperatures, simply by mixing the polyisocyanate combinations with the compounds which contain hydroxyl groups and/or carboxyl groups, optionally with the addition of water, catalysts, emulsifiers and other auxiliary agents such as flame retarding substances and blowing agents. Mechanical devices are advantageously used for this purpose, e.g. those described in French Pat. 1,074,713 and U.S. Reissue Pat. 24,514.

Numerous suitable flame retarding substances known in the art such as those that generally contain phosphorus, halogens, antimony, bismuth or boron may also be used. An account of known and suitable flame retarding agents is given in the chapter "Flammhemmende Substanzen," pp. 110–111, in Kunststoff-Handbuch volume 7, "Polyurethane" by Vieweg-Höchtlen, Publishers Carl-Henser-Verlag, Munich, 1966, and U.S. Pat. 3,201,372. The flame retarding substances are generally added in quantities of 1 to 20% by weight, preferably 1 to 15% by weight, based on the quantity of polyisocyanate combinations used.

Any suitable activators of known type may be used, e.g. tertiary amines such as triethylamine, dimethylbenzylamine, tetramethyl ethylenediamine, N-alkylmorpholines, endoethylenepiperazine, urotropine, hexahydrotriazines such as trimethylhexahydrotriazine and 2,4,6-dimethylaminomethylphenol or organic metal salts such as tin-(I) acylates, e.g. stannous salts of 2-ethylcaproic acid, dialkyl stannic acylates such as dibutyltin dilaurate or acetyl acetonates of heavy metals such as iron or any of those disclosed in U.S. Pat. 3,201,372 and the patents cited therein.

Suitable emulsifiers for the foam production include e.g. hydroxyethylated phenols, higher sulphonic acids, sulphonated castor oil, hydroxyethylated castor oil, sulphonated ricinoleic acid, ammonium salts of oleic acid and the like as well as any of those mentioned in U.S. Pat. 3,201,372. Any suitable foam stabilizers may be used including those based on polysiloxane-polyalkylene glycol copolymers or basic silicone oils. Other suitable emulsifiers, catalysts and additives are mentioned e.g. in "Polyurethanes, Chemistry and Technology," vols. I and II, Saunders-Frisch, Interscience Publishers, 1962 and 1964.

The quantities of polyisocyanate solution to be used according to the invention should generally be equivalent to the sum of reactive hydrogen atoms present but, if desired, the polyisocyanate solution may also be used in excess or in subequivalent amounts. When producing foam resins and using water as blowing agent, the polyisocyanate will be used in a sufficient excess to react with the amount of water used. Excess amounts of isocyanates may also be assimilated into the foam during the foaming process by conversion into isocyanurate groups, uretdione groups and/or carbodiimide groups by the addition of trivalent or pentavalent phosphorus compounds such as phospholidines, pholine oxides or tertiary esters, amides or esteramides of phosphorous or phosphoric acid and the like.

The hard foam resins obtained by the process of this invention are widely used e.g. in the building industry as building panels, sandwich elements, ceiling panels and parapet panels, for thermal insulation in refrigerators, cold stores, refrigerator cars and cooling containers, in road and railway building, for technical insulation of pipes, for the insulation of fuel depots and in shipbuilding, as air filters and filters for hydrocarbons in internal combustion engines, and as shock absorbent packaging material. The foam products of the process may be hard or semi-hard.

The process of this invention may also be used to produce hard polyurethane resins having a compact or non-cellular surface and cellular core which are foamed in the mold. Such products possess surprisingly smooth, homogenous marginal zones and cellular cores and are highly resistant to heat distortion.

The invention is further illustrated but is not intended to be limited by the following examples in which all parts and percentages are by weight unless otherwise specified.

(A) Preparation of biuret polyisocyanate solution in monomeric polyisocyanates: About 1218 parts of 1-methyl-benzene-2,4-diisocyanate in which about 1.5 parts of castor oil polyglycol ether have previously been dissolved are heated to about 90° C. About 27 parts of water are added dropwise at a uniform rate over the course of about 2½ hours with vigorous stirring. When all of the water has been added, the temperature is raised to about 165° C. over the course of about 45 minutes. The reaction mixture is then cooled and a crude solution which contains about 67% of biuret polyisocyanate mixture and which has a viscosity of 1580 centipoises at 21° C. is obtained. The NCO content of the solution is 34.6%.

The crude solution is freed from monomeric 1-methyl-benzene-2,4-diisocyanate by thin layer evaporation at 135° C. and 0.2 mm. Hg for analytical investigation. NCO content of the biuret polyisocyanate resin: 24.8%. About 100 parts of the resin are dissolved in 100 parts of ethyl acetate/acetone (1:1) and divided into 8 fractions by the addition of 50 parts by weight of cyclohexane each time.

The fractions are found to have NCO contents of from about 24.3% to about 25.3% although after their conversion into polyurethane with ethanol as the monohydric alcohol, they differ from each other in their osmotically determined molecular weight. Thus approximately 34% by weight of the biuret polyisocyanate resins consist of tetra- and pentaisocyanates and approximately 65% by weight of triisocyanate N,N',N''-(3-isocyanato-4-methylphenyl) biuret, the triethylurethane of which as a calculated molecular weight of 660 (calculated 634).

(B) About 21 parts of water are added dropwise over the course of about 30 minutes with stirring at about 60° C. to about 1050 parts of a commercial mixture of tolylene diisocyanate isomers consisting of about 80 parts of 1-methyl-benzene-2,4-diisocyanate and about 20 parts of 1-methyl-benzene-2,6-diisocyanate into which about 2 parts of ricinoleic polyglycol ether have previously been stirred. The precipitate which forms goes into solution when the reaction mixture is subsequently heated to about 170° C. After the temperature has been maintained at 170° C. for about 3 hours, the reaction mixture is rapidly cooled to room temperature. The product obtained has an NCO content of 33.7% and a viscosity (25° C.) of 3000 cp.

PREPARATION OF POLYETHER MIXTURES

The following mixtures are prepared from an ethylene oxide polyether having an OH number of 533 which has been initiated with trimethylolpropane and an ethylene oxide polyether having an OH number of 533 which has been initiated with sorbitol:

TABLE I

| Sorbitol polyether (parts) | Mixture | | |
|---|---|---|---|
| | I | II | III |
| Sorbitol polyether (parts) | 75 | 50 | 25 |
| Trimethylolpropane polyether (parts) | 25 | 50 | 75 |

Examples 1 to 3

About 100 parts of Mixtures I, II and III are each intimately mixed with about 40 parts of monofluorotrichloromethane, about 0.2 part of endoethylene piperazine, about 1 part of silicone stabilizer (SF 1109 of General Electric) and about 20 parts of the polyisocyanates described under (B) (NCO content 33.7%).

The physical properties of the resulting foam resins are shown in the following table:

TABLE II

| Polyol mixture | Mixture | | |
|---|---|---|---|
| | I | II | III |
| Unit weight (kg./m.$^3$) | 31 | 26 | 28 |
| Compression strength (kg. wt./cm.$^2$) | 2.0 | 2.2 | 3.0 |
| Heat bending resistance (0° C.) | 160 | 130 | 135 |
| Dimensional change (percent): | | | |
| +100° C | 0 | 0 | 0 |
| −30° C | 0 | 0 | |

Example 4

About 100 parts of a polyol mixture having an OH number of 510 of which 50 OH% consists of sucrose/ethylene oxide polyether and 50 OH% consists of trimethylolpropane/ethylene oxide polyether are intimately mixed with about 40 parts of monofluorotrichloromethane, about 0.2 part of endoethylene piperazine, about 1 part of silicone stabilizer (SF 1109 of General Electric) and about 117 parts of the polyisocyanate prepared under (B) (NCO content 33.7%). A hard polyurethane foam resin which has the following physical properties is obtained:

Unit weight: 30 kg./m.$^3$
Compression strength: 3.0 kg. wt./cm.$^2$
Heat bending resistance: 134° C.

The foam resin shows no dimensional change at +100° C. and −30° C.

Example 5

(a) About 3,620 parts of 2,4-diethyltolylene-2,5-diamine are added dropwise to about 4,495 parts of isophorone diisocyanate at about 120° C. (The temperature should not exceed about 150° C. during this operation.) The mixture is then heated at about 170° C. for about 1 hour. A biuret polyisocyanate which has an NCO content of 27.8% and a viscosity of 1088 cp. (at 25° C.) is obtained.

(b) About 100 parts of the polyol used in Example 4, about 40 parts of monofluorotrichloromethane, about 1 part of a silicone stabilizer (SF 109 of General Electric) and about 2 parts of stannous octoate are vigorously stirred together with about 153 parts of the polyisocyanate prepared according to (a).

A hard polyurethane foam resin which has the following mechanical properties is obtained:

Unit weight: 40 kg./m.$^3$
Compression strength: 2.9 wt./cm.$^2$
Heat bending resistance: 130° C.

No yellowing of the foam resin occurs after 200 hours irradiation with a xenon lamp.

Example 6

(a) About 1492 parts of a mixture of about 80% of 2,4- and about 20% of 2,6-tolylene diisocyanate are mixed at room temperature with about 400 parts of an ethylene oxide polyether having an OH number of 533 which has been initiated with sorbitol (NCO:OH=4.5:1). The maximum temperature of about 70° C. is reached after about 25 minutes. After cooling, a storage stable semi-prepolymer which has an NCO content of 31.1% and a viscosity of 1938 cp. (at 25° C.) is obtained.

(b) A mixture of about 50 parts of an ethylene oxide polyether having an OH number of 533 which has been initiated with trimethylol propane, about 50 parts of an ethylene oxide polyether having the same OH number which has been initiated with sorbitol, about 1 part of a silicone stabilizer (SF 1109 of General Electric), about 0.8 part of pentamethyldiethylene triamine and about 40 parts of monofluorotrichloromethane is vigorously stirred together with about 130 parts of the semi-prepolymer prepared according to (a). A hard polyurethane foam resin which has the following mechanical properties is obtained.

Unit weight: 31 kg./m.$^3$
Compression strength: 2.2 kg. wt./cm.$^2$
Heat bending resistance: 109° C.

Example 7

(a) About 145 parts of finely powdered diethylene glycol bis-4-aminobenzoate are added over the course of about 10 minutes at about 130° C. to about 916 parts of a mixture of about 80% of 2,4- and about 20% of 2,6-tolylene diisocyanate. The mixture is then heated at about 170° C. for about 1 hour. A biuret polyisocyanate which has an NCO content of 35.7% and a viscosity of 433 cp. (at 25° C.) is obtained.

(b) A mixture of about 100 parts of an ethylene oxide polyether having an OH number of 510 of which about 70 OH% has been initiated with sucrose and about 30 OH% with trimethylol propane, about 40 parts of monofluorotrichloromethane, about 0.8 part of pentamethyl diethylene triamine and about 1 part of a silicone stabilizer is thoroughly stirred together with about 107 parts of the biuret polyisocyanate prepared according to (a). A hard foam resin which has the following mechanical properties is obtained:

Unit weight: 27 kg./m.$^3$
Compression strength: 1.6 kg. wt./cm.$^2$
Heat bending resistance: 145° C.

Example 8

(a) About 1000 parts of 4,4'-diisocyanatodiphenylmethane and about 2.5 parts of a ricinoleic polyethylene glycol ether are stirred together at about 50° C. About 15 parts of water are then added dropwise with stirring. The suspension obtained is heated to about 170° C. for about 2 hours. A biuret polyisocyanate which is liquid at room temperature and which has an NCO content of 24.1% and a viscosity of 5700 cp. (at 25° C.) is obtained.

(b) A mixture of about 100 parts of an ethylene oxide polyether having an OH number of 510, the initiating components of which consist of about 30 OH% sucrose and about 70 OH% of trimethylol propane, about 40 parts of monofluorotrichloromethane, about 1 part of pentamethyl diethylene triamine and about 1 part of silicone stabilizer (SF 1109 of General Electric) is vigorously stirred together with about 155 parts of the biuret polyisocyanate prepared according to (A). A hard polyurethane foam resin which has the following mechanical properties is obtained:

Unit weight: 38 kg./m.$^3$
Compression strength: 2.2 kg. wt./cm.$^2$
Heat bending resistance: 122° C.

Example 9

(a) About 100 parts of a polyol having an OH number of 508, the initiating components of which consist of about 49% of trimethylolpropane and about 51% of sucrose alkoxylated with a mixture of 65% of ethylene oxide and 35% of propylene oxide, are intimately mixed with about 40 parts of monofluorotrichloromethane, about 0.2 part of endoethylene piperazine, about 1 part of a silicone stabilizer (SF 1109 of General Electric) and about 117 parts of the polyisocyanate prepared under (B) (NCO content 33.7%). A hard polyurethane foam resin which has the following physical properties is obtained:

Unit weight: 32 kg./m.³
Compression strength: 2.7 kg. wt./cm.²
Heat bending resistance: 134° C.

(b) A mixture of about 50 parts of an ethylene oxide polyether having an OH number of 533 which has been initiated with trimethylol propane, about 50 parts of an ethylene oxide polyether having an OH number of 510 which has been initiated with sucrose, about 2 parts of water, about 1 part of a silicone stabilizer (SF 1109 of General Electric), about 0.3 part of endoethylene piperazine and about 20 parts of monofluorotrichloromethane is vigorously stirred together with about 149 parts of the biuret polyisocyanate prepared according to (a). A hard polyurethane foam resin which has the following physical properties is obtained:

Unit weight: 54 kg./m.³
Compression strength: 5.3 kg. wt./cm.²
Heat bending resistance: 135° C.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Polyurethane foam resins prepared by a process comprising reacting, in the presence of a blowing agent, a solution in a liquid monomeric polyisocyanate free of biuret and urethane groups of from about 20% to about 80% by weight of a biuret polyisocyanate, said solution containing .03% to about 5% of a chemically bound emulsifier selected from the group consisting of castor oil polyglycol ether and ricinoleic polyethylene glycol ether with a mixture of hydroxy polyethers having a molecular weight of from about 100 to 5,000, from about 65% to about 100% of the alkylene oxide constituency of which is derived from ethylene oxide, from about 25% to about 75% by weight of the polyether mixture having a functionality of two or three and from about 75% to about 25% by weight of the polyether mixture having a functionality of four to eight.

2. The polyurethane of claim 1 wherein the solution of biuret polyisocyanate contains 0.1% to about 2% by weight of the chemically bound emulsifier.

3. The polyurethane of claim 1 wherein 100% of the alkylene oxide constituency of the polyether is derived from ethylene oxide.

4. The polyurethane of claim 1 wherein from about 60% to about 40% by weight of the polyethers in the admixture have a functionality of two or three and from about 40% to about 60% by weight of the polyethers in the admixture have a functionality of four to eight.

5. The polyurethane of claim 1 wherein the biuret polyisocyanate has the formula:

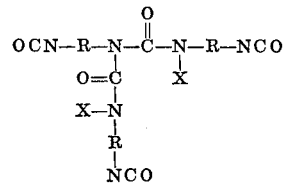

in which R is a divalent aliphatic, araliphatic, cycloaliphatic or aromatic radical and X is hydrogen or

wherein $n$ is an integer of from 0 to 5.

6. The polyurethane of claim 1 wherein the quantity of biuret polyisocyanate containing more than three isocyanate groups is at least 40% by weight based on the total quantity of biuret polyisocyanate and polyisocyanate free from biuret groups.

7. The polyurethane of claim 1 wherein the polyether is an alkylene oxide adduct of trimethylol propane, pentaerythritol, sorbitol or sucrose.

References Cited
UNITED STATES PATENTS

| | | | |
|---|---|---|---|
| 3,072,582 | 1/1963 | Frost | 260—2.5 |
| 3,288,732 | 11/1966 | Chapman et al. | 260—2.5 |
| 3,392,183 | 7/1968 | Windemuth et al. | 260—453 |
| 3,591,560 | 7/1971 | Wagner et al. | 260—77.5 |
| 3,201,372 | 8/1965 | Wagner et al. | 260—77.5 |
| 3,471,416 | 10/1969 | Fijal | 260—2.5 |
| 3,585,230 | 6/1971 | Woycheshin et al. | 260—453 |
| 3,124,605 | 3/1964 | Wagner | 260—453 |

DONALD E. CZAJA, Primary Examiner
H. S. COCKERAM, Assistant Examiner

U.S. Cl. X.R.

260—2.5 AG, 2.5 AP, 2.5 AS, 18 TN, 77.5 AT

Disclaimer 3,793,268.—*Werner Dietrich*, Cologne-Stammheim, *Konrad Uhlig* and *Kuno Wagner*, Leverkusen, *Dieter Maaben* and *Horst Conrad*, Dormagen, and *Heinrich Bormann* and *Helmut Piechota*, Leverkusen, Germany. PROCESS FOR THE PRODUCTION OF POLYURETHANE FOAM RESINS. Patent dated Feb. 19, 1974. Disclaimer filed Aug. 30, 1974, by the assignee, *Bayer Aktiengesellschaft*.

Hereby enters this disclaimer to claims 1 thru 7 of said patent.

[*Official Gazette November 12, 1974.*]